United States Patent
Ammon et al.

(10) Patent No.: US 8,116,941 B2
(45) Date of Patent: Feb. 14, 2012

(54) METHOD FOR OPERATING AN ACTIVE CHASSIS SYSTEM

(75) Inventors: Dieter Ammon, Remseck (DE); Carsten Knoeppel, Stuttgart (DE); Magnus Rau, Kirchheim unter Teck (DE); Avshalom Suissa, Althengstett (DE)

(73) Assignee: Daimler AG, Stuttgart (DE)

( * ) Notice: Subject to any disclaimer, the term of this patent is extended or adjusted under 35 U.S.C. 154(b) by 911 days.

(21) Appl. No.: 10/589,628

(22) PCT Filed: Oct. 9, 2004

(86) PCT No.: PCT/EP2004/011313
§ 371 (c)(1),
(2), (4) Date: Jul. 16, 2008

(87) PCT Pub. No.: WO2005/080102
PCT Pub. Date: Sep. 1, 2005

(65) Prior Publication Data
US 2008/0275607 A1    Nov. 6, 2008

(30) Foreign Application Priority Data
Feb. 17, 2004  (DE) .......................... 10 2004 007 549

(51) Int. Cl.
*B62D 6/00* (2006.01)
(52) U.S. Cl. .............. 701/41; 701/37; 701/82; 280/5.52
(58) Field of Classification Search ............. 701/23, 701/37–42, 82, 44; 280/5.52, 5.522; 348/119
See application file for complete search history.

(56) References Cited

U.S. PATENT DOCUMENTS

| | | | |
|---|---|---|---|
| 4,974,875 A | 12/1990 | Sugasawa et al. | |
| 5,029,892 A * | 7/1991 | Miwa | 280/5.51 |
| 5,540,298 A * | 7/1996 | Yoshioka et al. | 180/169 |
| 6,036,199 A * | 3/2000 | Oshida et al. | 280/5.504 |
| 6,539,298 B2 * | 3/2003 | Inagaki et al. | 701/70 |

(Continued)

FOREIGN PATENT DOCUMENTS

DE   37 05 520 C2   9/1988
(Continued)

OTHER PUBLICATIONS

International Search Report dated Dec. 30, 2004 including English Translation of relevant portion and PCT/ISA/237 (Ten (10) pages).

*Primary Examiner* — Paul N Dickson
*Assistant Examiner* — Timothy Wilhelm
(74) *Attorney, Agent, or Firm* — Crowell & Moring LLP

(57) ABSTRACT

A method is provided for operating an active chassis system, in which wheels of at least one axle are arranged with a toe-in angle, and actuating elements which interact with supporting assemblies which are arranged between the wheels and a vehicle body. Wheel contact forces of the wheels assume different values as a result of the actuating elements being actuated. A side force is generated at the wheels which have a toe-in angle, and a resulting yaw moment is produced. A desired yaw rate is determined based upon information from a device which is arranged in the vehicle in order to determine the profile of the roadway in a control unit, and the wheel contact forces are set as a function of the desired yaw rate.

11 Claims, 2 Drawing Sheets

U.S. PATENT DOCUMENTS

| | | |
|---|---|---|
| 6,543,278 B1 * | 4/2003 | Kogure ............................ 73/146 |
| 6,663,113 B2 * | 12/2003 | Schulke et al. ............ 280/5.505 |
| 6,719,087 B2 * | 4/2004 | Demerly ....................... 180/402 |
| 7,330,785 B2 * | 2/2008 | Odenthal et al. ................. 701/70 |
| 7,480,553 B2 * | 1/2009 | Hofmann et al. ............... 701/69 |
| 2002/0007239 A1 | 1/2002 | Matsumoto et al. |
| 2002/0109309 A1 * | 8/2002 | Schulke et al. ............ 280/5.505 |
| 2002/0147532 A1 * | 10/2002 | Inagaki et al. ................... 701/41 |
| 2003/0111805 A1 | 6/2003 | Carlstedt et al. |
| 2003/0149515 A1 * | 8/2003 | Hessmert et al. ............... 701/29 |

FOREIGN PATENT DOCUMENTS

| | | |
|---|---|---|
| DE | 38 44 803 C2 | 12/1989 |
| DE | 102 26 683 A1 | 12/2003 |
| JP | 11-11130 A | 1/1999 |
| JP | 11011130 A * | 1/1999 |

* cited by examiner

METHOD FOR OPERATING AN ACTIVE CHASSIS SYSTEM

This application is a National Phase of PCT/EP2004/011313, filed Oct. 9, 2004, and claims the priority of DE 10 2004 007 549.2, filed Feb. 17, 2004, the disclosures of which are expressly incorporated by reference herein.

BACKGROUND AND SUMMARY OF THE INVENTION

The present invention relates to a method for operating an active chassis system.

DE 38 44 803 C1 discloses an active chassis system whose support assemblies can be used to set a targeted change in the supporting forces. When deviations occur in the rolling angles and pitching angles in relation to the respective desired values, changes in the supporting forces and associated wheel contact forces are changed actively. Furthermore, the support assemblies provide the possibility of selectively counteracting, at individual wheel suspension means, wheel movements which adversely affect the ground grip of the wheels.

DE 37 05 520 A1 discloses a control unit for influencing the wheel contact forces of a vehicle which automatically reduces a deviation of the vehicle from the course predefined by a steering wheel lock.

An object of the present invention is to permit a change in travel direction by actively changing the wheel contact forces of the vehicle in further driving situations.

This object has been achieved by a method on which a desired yaw rate is determined from the information of a device arranged in the vehicle for the purpose of determining the profile of the roadway in a control unit, and the wheel contact forces are set as a function of the desired yaw rate. The relationship between the desired yaw rate, i.e., a desired yaw rate and the wheel contact forces, is described by means of a characteristic curve or a calculation model.

The device for determining the profile of the roadway senses, for example, the profile of the road, road markings, boundary posts, obstacles or other road users. This information is used as a basis for calculating a desired yaw rate. The device for determining the profile of the road can be implemented, for example, as an optical camera for detecting the environment or as a radar device.

The desired yaw rate is preferably calculated in a control unit which actuates actuating elements which interact with the support assemblies. This control unit can also be combined with other control units, for example a control unit for an electronic stability program (ESP). By actuating the actuating elements, unequal contact forces can be set at the wheels of an axle, unequal side forces also occurring at the wheels. As a result, a resulting side force acts on the axle so that a yaw moment which acts at the center of gravity of the vehicle is produced. This method advantageously changes the direction of travel of the vehicle without the driver's intervention, during which process no disruptive reaction moments occur at the steering wheel.

In a further refinement of the invention, the desired yaw rate is calculated as a function of a velocity and/or a yaw rate. In order to determine the desired yaw rate, it is necessary not only to have information from the device for determining the profile of the roadway but also information about the current travel state which is described by means of the velocity, the yaw rate and the steering wheel angle. This information is advantageously made available to the control unit by a data bus. When the vehicle deviates from a desired course due to interference influences, the desired yaw rate which is to be set by the actuating elements depends on the velocity of the vehicle. To the same degree, the steering wheel angle is necessary to correct the direction of travel of the desired direction of travel predefined by the driver by way of a steering wheel. The information about the current travel state permits the direction of travel of the vehicle to be influenced in a reliable and convenient fashion.

In a further refinement of the invention, a desired course is calculated from the information from the device for determining the profile of the roadway. The motor vehicle is guided along the desired course by actuating the actuating elements. The device for determining the profile of the roadway senses information about the environment such as side strips or median strips, lane boundary markers such as crash guard rails or road posts. A virtual desired course is determined from the profile of the roadway and the vehicle is guided along this desired course by changing the wheel contact forces by actuating the actuating elements.

In a still further refinement of the invention, the device for determining the profile of the roadway detects a deviation of the direction of travel of the vehicle from the direction of travel predefined by the driver and is compensated by actuating the actuating elements. These deviations can have numerous causes such as side wind, lateral inclination of the roadway or track grooves. Alternatively, or in addition to the device for determining the profile of the roadway, a deviation in the direction of travel of the vehicle from the direction of travel predefined by the driver can also be detected by evaluating wheel speed differences, steering angles and/or steering torques. The deviations are advantageously compensated by changing the wheel contact forces without the driver feeling disruptive feedback at the steering wheel.

In a further refinement of the invention, an obstacle is detected by the device for determining the profile of the roadway and is avoided by actuating the actuating elements. As soon as the device for determining the profile of the roadway detects an obstacle, a desired yaw rate is calculated. The actuating elements are actuated as a function of the desired yaw rate and an obstacle is avoided. The necessary data such as distance from and dimensions of the obstacle which are necessary to calculate the desired yaw rate can be supplied, for example, by a radar device or an optical camera.

In a yet further refinement of the invention, when straight-ahead travel is detected by the device for determining the profile of the roadway and when there is steering torque which is permanently present, the actuating elements are actuated so that the steering torque is reduced while the direction of travel is maintained. With this method, certain fabrication tolerances or even slight changes in the axle geometry owing to damage by changes in the wheel contact forces can be compensated so that the steering torque is reduced for straight-ahead travel, or is at best zero.

The system which comprises the device for determining the profile of the roadway and a steering torque measuring device detects that in the case of straight-ahead travel a continuous steering torque is present. By correspondingly changing the wheel contact forces, the steering torque ideally becomes zero so that the vehicle is made to travel straight ahead without steering torque. The straight-ahead travel can alternatively also be detected by a satellite-supported locating system such as GPS (Global Positioning System).

In addition to or as a simple alternative to the device for determining the profile of the roadway, the driver can be relieved of continuous steering torque even via a steering torque measuring device and/or a steering angle sensor. For example, by an evaluation of the steering torque over a relatively long time period can detect that the driver has to continuously apply a steering torque when traveling straight ahead. By changing the wheel contact forces, the steering torque is reduced or eliminated. An additional steering angle sensor permits easier detection of the straight-ahead travel. In conjunction with a device for determining the profile of the roadway, signals of the steering angle sensor can also be used for checking the plausibility of the direction of travel.

The wheel contact forces ($F_{11}$-$F_{14}$) can be set by actuating elements which change the prestressing of a helical spring or of an air spring or of a hydraulic spring. The wheel contact forces can be set by varying the prestress of the spring.

In another embodiment of the invention, the wheel contact forces ($F_{11}$-$F_{14}$) are set by actuating elements which change the prestressing of a stabilizer. The system utilizes the already existing stabilizer and is thus cost-effective to perform.

The toe-in angle and the associated slip angle α at a front axle and/or a rear axle can be changed as required by an adjustment element. The level of the yaw moment which can be generated by changing the wheel contact forces is dependent on the toe-in angles which are set. Since a permanently set large toe-in angle causes a high level of wear of the tires and high fuel consumption, an adjustment element is provided which increases the toe-in angle only when required. This adjustment element is arranged, for example, in track rods of the front axle and/or rear axle. The level of the yaw moment which is necessary to correct the direction of travel is thus advantageously increased.

In a still further embodiment of the invention, a desired yaw rate is determined from at least one of the sensed values such as wheel speed differences, steering wheel angle and/or steering torque instead of from information from the device for determining the profile of the roadway. An interference from side wind or a laterally inclined roadway can be detected by a wheel speed difference which occurs when the steering angle is unchanged. A desired yaw rate which is necessary for compensating the deviation of the vehicle from a desired direction of travel, for example due to a gust of side wind, is determined from a model-based calculation or a characteristic diagram. The wheel contact forces are changed by actuating the actuating elements as a function of the desired yaw rate. Taking into account the steering torque permits the driver interventions to be taken into account and avoids overcompensation of interference.

Other objects, advantages and novel features of the present invention will become apparent from the following detailed description of the invention when considered in conjunction with the accompanying drawings.

DETAILED DESCRIPTION OF THE DRAWINGS

Identical components and physical variables are designated by the same reference numbers in FIGS. 1-4.

Figure 1:
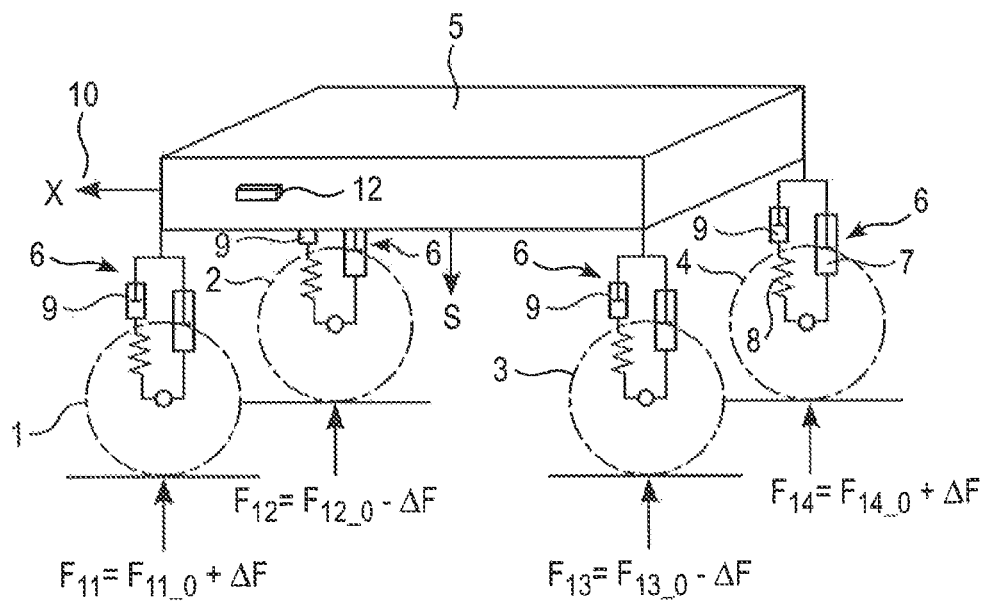
FIG. 1 is a schematic illustration of a vehicle model with an actively controllable spring damper system.

FIG. 1 is a schematic illustration of a motor vehicle which has an active chassis system. The connection between the wheels 1, 2, 3, 4 and the vehicle body 5 is formed in each case by an actively controllable support assembly designated generally by numeral 6 which is embodied as a spring damper system. The spring damper system 6 has a spring 8 such as, for example, a steel spring or an air spring, a damper 7 and a hydraulically controllable actuating element 9. The spring damper system 6 is arranged between the vehicle body 5 and a part which can move in relation to the body 5, such as, for example, a wheel carrier or a connecting rod. The damper 7 is connected in parallel with a series connection of the spring 8 and actuating element 9. By actuating the actuating element 9 the force of the spring 8 can be changed. A known type of pump (not illustrated) which is driven by the vehicle engine serves as hydraulic pressure source. The pressure actuation of the actuating elements 9 is provided by a valve unit which is in turn connected to a control unit 12. Furthermore, the control unit 12 is connected to displacement sensors which represent the respective excursion position of the wheels 1, 2, 3, 4 in relation the vehicle body 5.

Due to the gravitational force S of the vehicle body, a wheel contact force $F_{11\_0}$, $F_{12\_0}$, $F_{13\_0}$, $F_{14\_0}$ acts on each wheel 1, 2, 3, 4. The wheel contact forces $F_{11\_0}$-$F_{14\_0}$ are increased or reduced to a value $F_{11}$-$F_{14}$ by actuating the actuating element 9.

Figure 2:
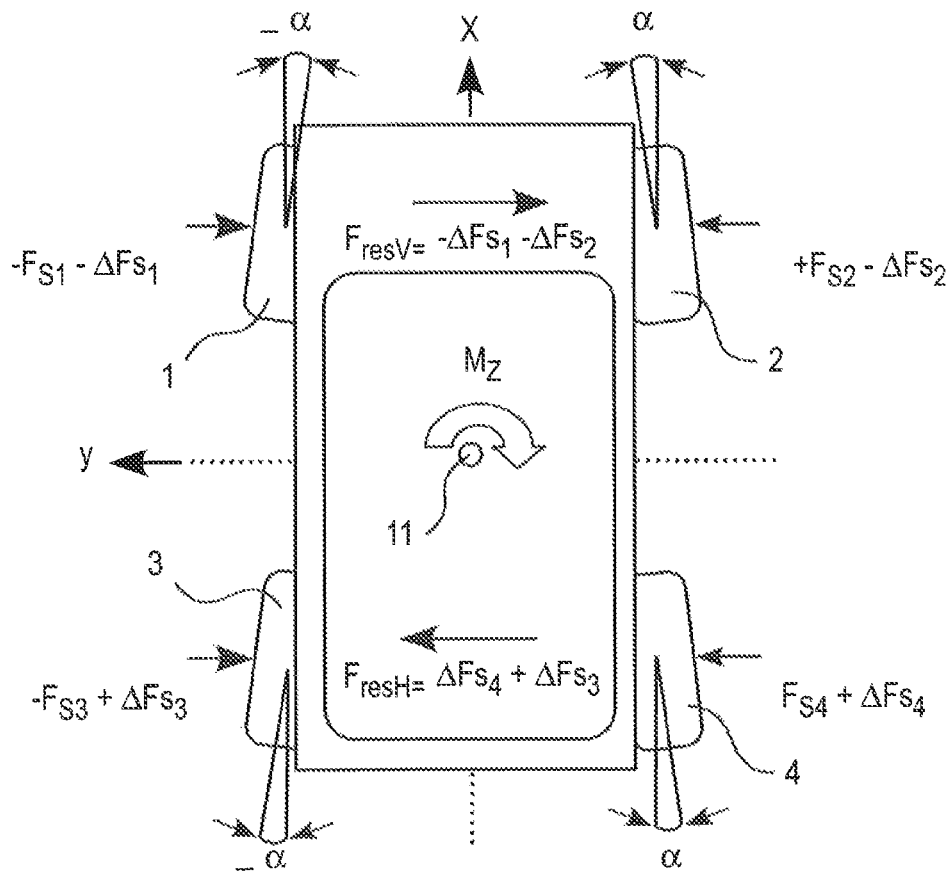
FIG. 2 is a schematic plan view of the vehicle with side forces represented.

The wheels 1-4 of the vehicle illustrated in FIG. 2 have a positive toe-in angle. If the wheel contact forces $F_{11\_0}$-$F_{14\_0}$ of the wheels 1-4 of an axle are of equal size, the side forces $F_{SV}$, $F_{SH}$ which are generated owing to the occurrence of a slip angle α at the wheels 1-4 of an axle are equally large. The resulting side force is therefore zero and the vehicle travels straight ahead. The active chassis system then provides the ability of setting different wheel contact forces $F_{11}$-$F_{14}$. The wheel contact forces $F_{11}$-$F_{14}$ can thus advantageously be set in such a way that a yaw moment $M_z$ acts on the vehicle. In order to avoid worsening the driver's comfort, the wheel contact forces $F_{11}$-$F_{14}$ can be varied in such a way that the vehicle body 5 does not move.

In the vehicle illustrated in FIG. 2, the idealized position S of the center of gravity is located centrally between the front and rear axles and centrally between the left-hand wheels 1, 3 and right-hand wheels 2, 4. The idealized position of the center of the gravity is based on the functional description of the method, and the method can of course also be applied with any other position of the center of gravity. In this context, for example, the contact force $F_{11\_0}$ at the wheel 1 and the contact force $F_{14\_0}$ at the wheel 4 are increased by a predeterminable absolute value ΔF, and the contact force $F_{13\_0}$ of the wheel 3 and the contact force $F_{12\_0}$ of the wheel 2 are simultaneously reduced by the same absolute value ΔF.

The effective wheel contact forces $F_{11}$-$F_{14}$ in FIG. 1 are then:

$$F_{11} = F_{11\_0} + \Delta F$$

$$F_{12} = F_{12\_0} - \Delta F$$

$$F_{13} = F_{13\_0} - \Delta F$$

$$F_{14} = F_{14\_0} + \Delta F$$

These different wheel contact forces $F_{11}$-$F_{14}$ cause the vehicle to carry out a yaw movement and a lateral movement when it moves in the direction of travel 10 due to a change in the lateral force.

Figure 3:
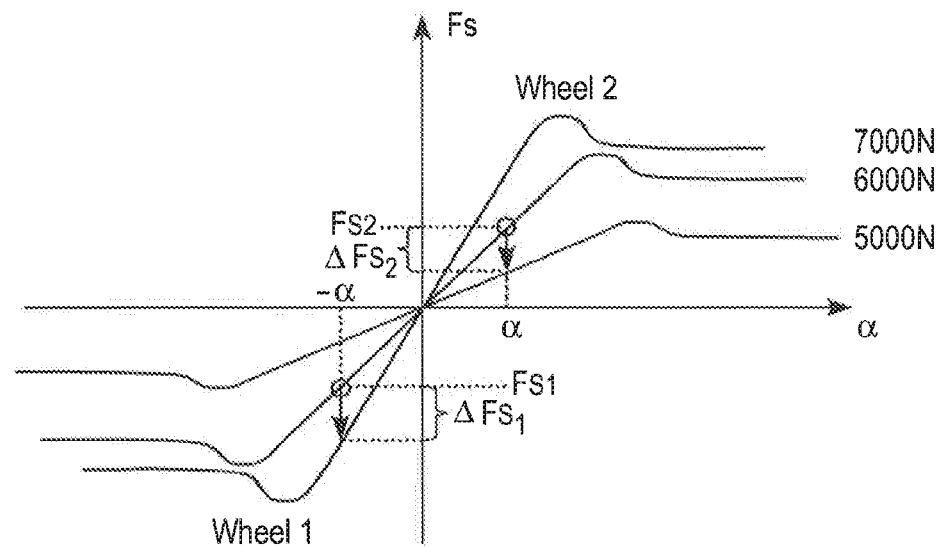
FIG. 3 is a graph showing the relationship between the side force and slip angle for a predefined wheel contact force.
Figure 4:
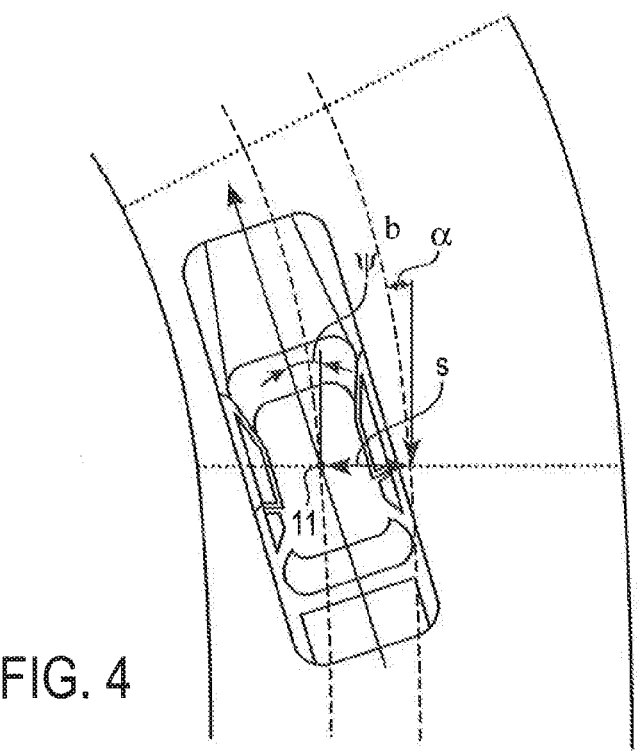
FIG. 4 is an illustration of necessary variables for detection of course holding.

Because of a permanently set toe-in angle and the movement of the vehicle in the travel direction 10, each wheel has a slip angle α which determines, as a function of the respective wheel contact force $F_{11}$-$F_{14}$ a side force Fs which acts on the wheel 1-4, as illustrated in FIG. 3. In this context, viewed in the travel direction 10, the right-hand wheels 2, 4 have a positive slip angle α, and the left-hand wheels 1, 3 have a negative slip angle −α. In the diagram in FIG. 3, the side forces Fs which act on a wheel are plotted qualitatively for various wheel contact forces, i.e., for 5000N, 6000N, 7000N, as a function of the slip angle α.

FIG. 3 is a qualitative illustration which serves to explain the method of the present invention. When the wheel contact forces $F_{11}$-$F_{14}$ are of equal size, the sum of the side forces Fs acting on an axle is zero owing to the symmetrical profile of the curve. For example, in the case of a wheel contact force $F_{11}$, $F_{12}$ of, respectively, 6000N at the wheels 1, 2 of the front axle the side force $F_{S1}$ at the left-hand wheel 1 is of equal magnitude in absolute terms when there is a slip angle −α to $F_{S2}$ at the right-hand wheel 2 with the slip angle α, the directions of force being opposed. For this case, the following applies for the resulting force $F_{resV}$ at the front axle:

$$F_{resV} = -F_{S1} + F_{S2} = 0.$$

According to the above equations, the forces on the system are matched in such a way that when the vehicle moves in the travel direction, side forces from which a yaw moment $M_z$ results act on the wheels 1, 2, 3, 4. The change in the wheel contact forces $F_{11}$-$F_{14}$ which is explained below as an example generates a right-hand rotating yaw moment $M_z$.

According to FIGS. 1 and 3, the wheel contact force $F_{11\_0}$ of the left-hand wheel is increased by a value $\Delta F = 1000N$ from 6000N to 7000N at the front axle, as a result of which the side force $F_{S1}$ rises in absolute terms by the value $\Delta F_{S1}$, as illustrated in FIGS. 2 and 3. At the right-hand wheel 2, the wheel contact force $F_{12\_0}$ is reduced by the same absolute value $\Delta F$ from 6000N to 5000N so that the side force $F_{S2}$ drops by the value $\Delta F_{S2}$. As a result, as seen in FIG. 2 a resulting side force which is directed counter to the direction of the y axis acts at the front axle, i.e., $$F_{resV} = -F_{S1} - \Delta F_{S1} + F_{S2} - \Delta F_{S2},$$

where when $F_{S1} = F_{S2}$ $$F_{resV} = -\Delta F_{S1} - \Delta F_{S2}.$$

According to the above equations, the wheel contact force $F_{13\_0}$ of the left-hand wheel 3 is lowered by the value $\Delta F = 1000N$ at the rear axle, and the wheel contact force $F_{14\_0}$ of the right-hand wheel is increased by the value $\Delta F = 1000N$.

Corresponding to a diagram of the slip angle/side force which is analogous to FIG. 3 and is associated with the wheel contact forces $F_{13\_0}$ and $F_{14\_0}$, the side force $F_{S3}$ at the left-hand wheel 3 now drops by the value $\Delta F_{S3}$, and at the right-hand wheel 4 the side force $F_{S4}$ rises by the value $\Delta F_{S4}$, the resulting side force at the rear axle then being $$F_{resH} = -F_{S3} + \Delta F_{S3} + F_{S4} + \Delta F_{S4},$$

where when $F_{S3} = F_{S4}$ $$F_{resH} = \Delta F_{S3} + \Delta F_{S4}$$

As a result, resulting side force $F_{resH} = \Delta F_{S3} + \Delta F_{S4}$, which counteracts the force at the front axle, acts on the rear axle. In the case of an identical axle load at the front and rear axles, the side forces $F_{resV}$ and $F_{resH}$ have an equally large value.

The side forces $F_{resV}$, $F_{resH}$ generate a right-hand rotating yaw moment $M_z$. In order to build up a left-hand rotating yaw moment, an increase in the wheel contact forces $F_{11}$-$F_{14}$ occurs at the front right-hand and rear left-hand wheels 2, 3, and a decrease in the wheel contact forces $F_{11}$-$F_{14}$ occurs at the front left-hand and rear right-hand wheels 1, 4. The yaw moment $M_z$ can be used to influence the direction of travel of the vehicle. The vehicle can be made to carry out a lateral movement and yawing movement by way of the yaw moment. This lateral movement of the vehicle can then be used, for example, to hold the vehicle's course without the driver having to perform a steering movement.

Information which is necessary for the vehicle to hold its course is sensed using for detecting the surroundings, i.e., a device for detecting the profile of the roadway such as, for example, an optical camera. The optical camera is used to detect the edge lanes of a roadway by means of differences in brightness. In order to detect the course, as well as the information according to FIG. 4, information about the current travel state such as velocity, yaw rate and steering wheel angle is also necessary and is combined with the image information in a course-holding detection apparatus. The course-holding detector supplies the following information to a course-holding controller:

distance s of the center of gravity 11 of the vehicle to the center line of the roadway, a yaw angle Ψ which is determined by the angle between the longitudinal axis of the vehicle and the tangent to the roadway, and the curvature k of the roadway, i.e., a change in speed of the curve angle α with the arc length b.

This information is used by the course-holding controller to determine a desired yaw rate which is necessary to guide the vehicle, for example along a center line of the roadway.

Associated wheel contact forces $F_{11}$-$F_{14}$ which are set by the actuating elements 9 are determined by the specific desired yaw rate. The wheel contact forces $F_{11}$-$F_{14}$ can be determined, for example, by characteristic curves, model-based calculations or by a yaw rate controller.

The course-holding detector, course-holding controller and the actuation device for the actuating elements are preferably arranged in a control unit.

With this method a vehicle can be guided along a desired course such as, for example, the center of the roadway.

To the same extent, the optical camera can also detect obstacles on the desired course so that a change of course can be initiated by changing the wheel contact forces $F_{11}$-$F_{14}$ in order to avoid the obstacle. The change in the direction of travel is advantageously carried out such that a driver does not feel any disruptive reaction torques at the steering wheel.

The desired course can also be defined as the direction of travel request set by the driver. The travel direction request is defined by the driver by the steering wheel angle and/or the steering wheel torque. A deviation from the desired direction of travel owing to the influence of interference such as, for example, side wind or an unevenness in the roadway, is detected by the optical camera and conditioned in the course-holding detector.

As already described, the conditioned data is transmitted to the course-holding controller which determines a desired yaw rate. In addition, reconciliation can be carried out with a desired yaw rate which can be determined from wheel speed differences and steering wheel angles. The calculated desired yaw rate is necessary to hold the vehicle on the virtual desired course defined by the travel direction request. In turn, the wheel contact forces $F_{11}$-$F_{14}$ to be set at the actuating elements 9 are determined from the desired yaw rate.

In one modified embodiment, a side force is produced only at one axle. If, for example, a vehicle has a toe-in only at the front axle, the direction of the vehicle can be corrected by changing the wheel contact forces $F_{11}$, $F_{12}$.

In a further embodiment, asymmetrical changes in the wheel contact forces $F_{11}$-$F_{14}$, i.e., with a ΔF of a different level, can furthermore be applied at the wheels 1, 2, 3, 4 when body movements are tolerated. Likewise, targeted body movements, which improve, for example, a driving impression when making a travel correction by changing the wheel contact forces can also be realized. When the positions S of the center of gravity are off center and deviate from those shown in FIG. 2, it is necessary, if appropriate, to accept body movements if they cannot be compensated by an asymmetrical change in the wheel contact forces.

In a further, modified embodiment (not illustrated) a device is contemplates with the scope of this invention and temporarily increases the toe-in of the wheels 1, 2, 3, 4 in order to achieve the necessary desired yaw moment. The maximum achievable yaw moment $M_z$ rises as the toe-angle increases. In order to avoid an increase in the rolling resistance and tire wear which is associated with a rising toe-in, the toe-in angle is increased only if such an increase is necessary to produce a requested desired yaw moment. With this device either a negative or a positive toe-in angle can be set at each axle depending on requirements.

In another unillustrated embodiment, the vehicle has actuating elements 9 in the form of servomotors or cylinders with which rolling stabilizers can be prestressed. As a result the wheel contact forces $F_{11}$-$F_{14}$ can be varied in such a way that a yaw moment $M_z$ is produced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating an active chassis system of a motor vehicle, comprising:
    arranging wheels of at least one axle with a toe-in,
    arranging support assemblies which interact with actuating elements between the wheels and a vehicle body, with wheel contact forces of the wheels assuming different values as a result of actuation of the actuating elements and a side force being generated at the wheels having the toe-in angle,
    profiling a roadway by an on-board device,
    determining, in a control unit, a desired yaw rate from the information of the on-board device, and
    setting the wheel contact forces as a function of the determined desired yaw rate to produce a resulting yaw moment.

2. The method as claimed in claim 1, wherein the determined desired yaw rate is calculated as a function of at least one of a velocity and a yaw rate.

3. The method as claimed in claim 1, wherein the desired yaw rate is calculated as a function of a steering wheel angle.

4. The method as claimed in claim 1, wherein the on-board device for profiling the roadway is configured to detect a profile of the roadway and calculate a desired driving course therefrom such that the vehicle is guidable along the desired course upon selective actuation of the actuating elements.

5. The method as claimed in claim 1, wherein a deviation of a travel direction of the vehicle from a travel direction predefined by a vehicle driver is detected from the information of the on-board device, and the deviation is compensated upon selective actuation of the actuating elements.

6. The method as claimed in claim 1, wherein an obstacle is detected by the on-board device so as to be avoided by selective actuation of the support assemblies.

7. The method as claimed in claim 1, wherein, upon detection of straight-ahead travel by the on-board device and a permanently present steering torque, the actuating elements are selectively actuated to reduce the steering torque and maintain the travel direction.

8. The method as claimed in claim 1, wherein the wheel contact forces are set by the actuating elements to change prestressing of one of a helical spring, an air spring and a hydraulic spring.

9. The method as claimed in claim 1, wherein the wheel contact forces are set by the actuating elements to change prestressing of a stabilizer.

10. The method as claimed in claim 1, wherein the toe-in angle and an associated slip angle at at least one of a front axle and a rear axle are changeable as required by an adjustment element.

11. The method as claimed in claim 1, wherein a desired yaw rate is determined from at least one sensed value, including at least one of wheel speed differences, steering wheel angle and steering torque, in lieu of from information from the on-board device.

* * * * *